United States Patent
Mandava et al.

(10) Patent No.: US 10,488,426 B2
(45) Date of Patent: Nov. 26, 2019

(54) SYSTEM FOR DETERMINING SPEED AND RELATED MAPPING INFORMATION FOR A SPEED DETECTOR

(71) Applicant: APPLIED CONCEPTS, INC., Richardson, TX (US)

(72) Inventors: Mahendra Mandava, Richardson, TX (US); Robert S. Gammenthaler, Princeton, TX (US); Russell D. Kautz, The Colony, TX (US); Steven F. Hocker, Gardner, KS (US)

(73) Assignee: APPLIED CONCEPTS, INC., Richardson, TX (US)

( * ) Notice: Subject to any disclaimer, the term of this patent is extended or adjusted under 35 U.S.C. 154(b) by 0 days.

(21) Appl. No.: 15/867,152

(22) Filed: Jan. 10, 2018

(65) Prior Publication Data

US 2019/0025429 A1    Jan. 24, 2019

Related U.S. Application Data

(60) Provisional application No. 62/535,711, filed on Jul. 21, 2017.

(51) Int. Cl.
*G01P 3/36* (2006.01)
*G06F 17/11* (2006.01)
(Continued)

(52) U.S. Cl.
CPC .................. *G01P 3/36* (2013.01); *G01P 3/44* (2013.01); *G01P 21/02* (2013.01); *G01S 7/4808* (2013.01);
(Continued)

(58) Field of Classification Search
CPC ....................................................... G01S 17/58
See application file for complete search history.

(56) References Cited

U.S. PATENT DOCUMENTS

| 3,371,341 A | 2/1968 | Stavis |
| 3,680,085 A | 7/1972 | Del Signore |

(Continued)

FOREIGN PATENT DOCUMENTS

| CN | 105358397 | 2/2016 |
| JP | 2003264481 | 9/2003 |

(Continued)

OTHER PUBLICATIONS http://www.oculii.com/VISDAR2000.php, 2013, 2 pages.
(Continued)

*Primary Examiner* — Manuel A Rivera Vargas
(74) *Attorney, Agent, or Firm* — Jackson Walker LLP; Christopher J. Rourk

(57) ABSTRACT

A system that can determine and provision speed and mapping information of a moving object. Time of flight data over a time period can be processed to determine ranges between the system and the moving object and the speed can be determined therefrom. The speed can be determined by calculating the radial velocity and tangential velocity of the object and taking the square root of the addition of the square of each. Alternatively, the speed can be determined by calculating a linear regression curve fit for instantaneous distances of the moving object in the direction of motion for a plurality of ranges and determining the slope of the linear regression curve fit. After a lock of the determined speed, system coordinates can be identified and associated with the speed. A map can be received based upon the system coordinates and the map, speed and speed related parameters can be communicated.

20 Claims, 6 Drawing Sheets

(51) Int. Cl.
*G01S 17/58* (2006.01)
*G01P 3/44* (2006.01)
*G01S 17/88* (2006.01)
*G01P 21/02* (2006.01)
*G01S 7/48* (2006.01)
*G01S 19/33* (2010.01)
*G01S 13/92* (2006.01)

(52) U.S. Cl.
CPC .............. *G01S 17/58* (2013.01); *G01S 17/88* (2013.01); *G01S 19/33* (2013.01); *G06F 17/11* (2013.01); *G01S 13/92* (2013.01)

(56) References Cited

U.S. PATENT DOCUMENTS

| | | |
|---|---|---|
| 3,760,414 A | 9/1973 | Nicolson |
| 3,833,906 A | 9/1974 | Augustine |
| 3,859,660 A | 1/1975 | Augustine et al. |
| 4,003,049 A | 1/1977 | Sterzer et al. |
| 4,052,722 A | 10/1977 | Millard |
| 4,072,945 A | 2/1978 | Katsumata et al. |
| 4,107,680 A | 8/1978 | Kaplan |
| 4,214,243 A | 7/1980 | Patterson |
| 4,219,878 A | 8/1980 | Goodson et al. |
| 4,335,383 A | 6/1982 | Berry |
| 4,635,059 A | 1/1987 | Ball |
| 4,673,937 A | 6/1987 | Davis |
| 4,740,045 A | 4/1988 | Goodson et al. |
| 4,789,904 A | 12/1988 | Peterson |
| 4,866,438 A | 9/1989 | Knisch |
| 4,949,186 A | 8/1990 | Peterson |
| 4,980,633 A | 12/1990 | Roskoni |
| 5,012,335 A | 4/1991 | Cohodar |
| 5,111,289 A | 5/1992 | Lucas et al. |
| 5,121,200 A | 6/1992 | Choi et al. |
| 5,204,682 A | 4/1993 | Beasley |
| 5,221,956 A | 6/1993 | Patterson et al. |
| 5,225,768 A | 7/1993 | Reaves, III |
| 5,289,181 A | 2/1994 | Watanabe et al. |
| 5,307,060 A | 4/1994 | Prevulsky et al. |
| 5,408,330 A | 4/1995 | Squicciarini et al. |
| 5,491,511 A | 2/1996 | Odle |
| 5,497,419 A | 3/1996 | Hill |
| 5,504,488 A | 4/1996 | Henderson et al. |
| 5,508,736 A | 4/1996 | Cooper |
| 5,525,996 A | 6/1996 | Aker et al. |
| 5,528,245 A | 6/1996 | Aker et al. |
| 5,528,246 A | 6/1996 | Henderson et al. |
| 5,563,603 A | 10/1996 | Aker et al. |
| 5,565,871 A | 10/1996 | Aker et al. |
| 5,570,093 A | 10/1996 | Aker et al. |
| 5,689,442 A | 11/1997 | Swanson et al. |
| 5,691,724 A | 11/1997 | Aker et al. |
| 5,764,769 A | 6/1998 | Bennett et al. |
| D405,333 S | 2/1999 | Wrigley |
| 5,917,430 A | 6/1999 | Greneker, III et al. |
| 5,979,586 A | 11/1999 | Farmer et al. |
| 5,982,105 A | 11/1999 | Masters |
| 6,008,752 A | 12/1999 | Husk et al. |
| 6,023,236 A | 2/2000 | Shelton |
| 6,028,528 A | 2/2000 | Lorenzetti et al. |
| 6,085,151 A | 7/2000 | Farmer et al. |
| 6,087,961 A | 7/2000 | Markow |
| 6,161,066 A | 12/2000 | Wright et al. |
| 6,198,427 B1 | 3/2001 | Aker et al. |
| 6,266,627 B1 | 7/2001 | Gatsonides |
| 6,292,111 B1 | 9/2001 | Ishikawa et al. |
| 6,330,025 B1 | 12/2001 | Arazi et al. |
| 6,369,747 B1 | 4/2002 | Ashihara |
| 6,389,340 B1 | 5/2002 | Rayner |
| 6,400,304 B1 | 6/2002 | Chubbs, III |
| 6,411,874 B2 | 6/2002 | Morgan et al. |
| 6,417,796 B1 | 7/2002 | Bowlds |
| 6,441,889 B1 | 8/2002 | Patterson |
| 6,462,702 B1 | 10/2002 | Bowlds |
| 6,501,418 B1 | 12/2002 | Aker |
| 6,518,881 B2 | 2/2003 | Monroe |
| 6,526,352 B1 | 2/2003 | Breed et al. |
| 6,529,831 B1 | 3/2003 | Smith et al. |
| 6,556,282 B2 | 4/2003 | Jamieson et al. |
| 6,580,386 B1 | 6/2003 | Aker et al. |
| 6,606,115 B1 | 8/2003 | Alicandro et al. |
| 6,614,362 B2 | 9/2003 | Siegel |
| 6,646,591 B2 | 11/2003 | Aker et al. |
| 6,677,858 B1 | 1/2004 | Faris et al. |
| 6,744,379 B1 | 6/2004 | Aker et al. |
| 6,798,374 B1 | 9/2004 | Smith |
| 6,831,593 B2 | 12/2004 | Aker et al. |
| 6,853,314 B1 | 2/2005 | Aker et al. |
| 6,864,832 B2 | 3/2005 | Mende et al. |
| 6,934,461 B1 | 8/2005 | Strub et al. |
| 6,970,183 B1 | 11/2005 | Monroe |
| 7,038,614 B1 | 5/2006 | Aker |
| 7,039,606 B2 | 5/2006 | Hoffman et al. |
| 7,049,999 B1 | 5/2006 | Aker |
| 7,057,550 B1 | 6/2006 | Aker |
| 7,068,212 B2 | 6/2006 | Aker et al. |
| 7,072,843 B2 | 7/2006 | Menninger et al. |
| 7,120,596 B2 | 10/2006 | Hoffman et al. |
| 7,171,379 B2 | 1/2007 | Menninger et al. |
| 7,188,026 B2 | 3/2007 | Tzamaloukas |
| 7,190,882 B2 | 3/2007 | Gammenthaler |
| 7,218,271 B2 | 5/2007 | Aker et al. |
| 7,227,494 B2 | 6/2007 | Aker |
| 7,365,676 B2 | 4/2008 | Mende |
| 7,388,474 B2 | 6/2008 | Yagyu et al. |
| 7,409,294 B2 | 8/2008 | Mead et al. |
| 7,411,544 B2 | 8/2008 | Aker et al. |
| 7,548,186 B2 | 6/2009 | Mende et al. |
| 7,579,786 B2 | 8/2009 | Soos |
| 7,613,722 B2 | 11/2009 | Horvitz et al. |
| 7,672,782 B2 | 3/2010 | Mead et al. |
| 7,864,102 B2 | 1/2011 | Aker |
| 7,961,301 B2 | 6/2011 | Earhart et al. |
| 7,982,660 B2 | 7/2011 | Meinecke et al. |
| 8,125,622 B2 | 2/2012 | Gammenthaler |
| 8,138,966 B2 | 3/2012 | Aker |
| 8,248,223 B2 | 8/2012 | Periwal |
| 8,378,884 B2 | 2/2013 | Aker |
| 8,393,601 B2 | 3/2013 | de Mola |
| 8,441,622 B2 | 5/2013 | Gammenthaler |
| 8,534,718 B2 | 9/2013 | de Mola |
| 8,610,881 B2 | 12/2013 | Gammenthaler |
| 8,755,984 B2 | 6/2014 | Rupp et al. |
| 9,070,289 B2 | 6/2015 | Saund et al. |
| 9,146,316 B2 | 9/2015 | Gammenthaler |
| 9,208,676 B2 | 12/2015 | Fadell et al. |
| 9,406,145 B2 | 8/2016 | Gammenthaler |
| 9,482,751 B2 | 11/2016 | Mandava et al. |
| 9,581,883 B2 | 2/2017 | Smits |
| 10,168,426 B2 | 1/2019 | Gammenthaler et al. |
| 2001/0038344 A1 | 11/2001 | Garcia |
| 2001/0054976 A1 | 12/2001 | Sauer |
| 2002/0014988 A1 | 2/2002 | Samukawa et al. |
| 2002/0032515 A1 | 3/2002 | Nakamura et al. |
| 2002/0080062 A1 | 6/2002 | Aker et al. |
| 2002/0089443 A1 | 7/2002 | Jones |
| 2002/0102961 A1 | 8/2002 | Gibbons et al. |
| 2002/0117340 A1 | 8/2002 | Stettner |
| 2002/0198660 A1 | 12/2002 | Lutter et al. |
| 2003/0009386 A1 | 1/2003 | Menninger |
| 2003/0014299 A1 | 1/2003 | Hoffman |
| 2003/0018513 A1 | 1/2003 | Hoffman et al. |
| 2003/0023464 A1 | 1/2003 | Burk |
| 2003/0023520 A1 | 1/2003 | Burk et al. |
| 2003/0023558 A1 | 1/2003 | Menninger |
| 2003/0028412 A1 | 2/2003 | Hoffman et al. |
| 2003/0040986 A1 | 2/2003 | Hoffman et al. |
| 2003/0041001 A1 | 2/2003 | Hoffman et al. |
| 2003/0046089 A1 | 3/2003 | Menninger et al. |
| 2003/0046120 A1 | 3/2003 | Hoffman et al. |
| 2003/0046136 A1 | 3/2003 | Hoffman et al. |
| 2003/0046190 A1 | 3/2003 | Hoffman et al. |

(56) References Cited

U.S. PATENT DOCUMENTS

| | | |
|---|---|---|
| 2003/0046214 A1 | 3/2003 | Menninger |
| 2003/0048301 A1 | 3/2003 | Menninger |
| 2003/0050807 A1 | 3/2003 | Hoffman et al. |
| 2003/0050808 A1 | 3/2003 | Mor |
| 2003/0050809 A1 | 3/2003 | Hoffman et al. |
| 2003/0050822 A1 | 3/2003 | Hoffman et al. |
| 2003/0050823 A1 | 3/2003 | Gehman et al. |
| 2003/0050828 A1 | 3/2003 | Hoffman et al. |
| 2003/0050845 A1 | 3/2003 | Hoffman et al. |
| 2003/0050859 A1 | 3/2003 | Rodriguez et al. |
| 2003/0050867 A1 | 3/2003 | Menninger et al. |
| 2003/0050868 A1 | 3/2003 | Hoffman et al. |
| 2003/0055692 A1 | 3/2003 | Menninger |
| 2003/0055693 A1 | 3/2003 | Hoffman et al. |
| 2003/0055694 A1 | 3/2003 | Menninger |
| 2003/0055700 A1 | 3/2003 | Hoffman et al. |
| 2003/0055704 A1 | 3/2003 | Reece |
| 2003/0055708 A1 | 3/2003 | Hoffman et al. |
| 2003/0055709 A1 | 3/2003 | Hoffman et al. |
| 2003/0055710 A1 | 3/2003 | Burk et al. |
| 2003/0055731 A1 | 3/2003 | Fouraker et al. |
| 2003/0055734 A1 | 3/2003 | Hoffman et al. |
| 2003/0055750 A1 | 3/2003 | Menninger |
| 2003/0061084 A1 | 3/2003 | Menninger |
| 2003/0061102 A1 | 3/2003 | Menninger et al. |
| 2003/0061124 A1 | 3/2003 | Menninger et al. |
| 2003/0061125 A1 | 3/2003 | Hoffman et al. |
| 2003/0061130 A1 | 3/2003 | Hoffman et al. |
| 2003/0061174 A1 | 3/2003 | Menninger |
| 2003/0065541 A1 | 4/2003 | Menninger |
| 2003/0065549 A1 | 4/2003 | Hoffman et al. |
| 2003/0065550 A1 | 4/2003 | Hoffman et al. |
| 2003/0065551 A1 | 4/2003 | Hoffman et al. |
| 2003/0065557 A1 | 4/2003 | Hoffman et al. |
| 2003/0065627 A1 | 4/2003 | Menninger |
| 2003/0066886 A1 | 4/2003 | Hoffman et al. |
| 2003/0069765 A1 | 4/2003 | Menninger |
| 2003/0069766 A1 | 4/2003 | Hoffman et al. |
| 2003/0069767 A1 | 4/2003 | Menninger |
| 2003/0069768 A1 | 4/2003 | Hoffman et al. |
| 2003/0069769 A1 | 4/2003 | Hoffman et al. |
| 2003/0069770 A1 | 4/2003 | Burk et al. |
| 2003/0069771 A1 | 4/2003 | Menninger et al. |
| 2003/0069774 A1 | 4/2003 | Hoffman et al. |
| 2003/0069779 A1 | 4/2003 | Menninger et al. |
| 2003/0069786 A1 | 4/2003 | Hoffman et al. |
| 2003/0069791 A1 | 4/2003 | Menninger |
| 2003/0069794 A1 | 4/2003 | Hoffman et al. |
| 2003/0069798 A1 | 4/2003 | Hoffman |
| 2003/0069799 A1 | 4/2003 | Hoffman et al. |
| 2003/0069813 A1 | 4/2003 | Burk |
| 2003/0069814 A1 | 4/2003 | Hoffman et al. |
| 2003/0069818 A1 | 4/2003 | Menninger |
| 2003/0069823 A1 | 4/2003 | Hoffman et al. |
| 2003/0069824 A1 | 4/2003 | Menninger |
| 2003/0069825 A1 | 4/2003 | Hoffman et al. |
| 2003/0074205 A1 | 4/2003 | Menninger |
| 2003/0074206 A1 | 4/2003 | Hoffman et al. |
| 2003/0074237 A1 | 4/2003 | Sechrist et al. |
| 2003/0074238 A1 | 4/2003 | Hoffman et al. |
| 2003/0074239 A1 | 4/2003 | Hoffman et al. |
| 2003/0074249 A1 | 4/2003 | Hoffman et al. |
| 2003/0074250 A1 | 4/2003 | Burk |
| 2003/0074262 A1 | 4/2003 | Hoffman et al. |
| 2003/0074263 A1 | 4/2003 | Hoffman et al. |
| 2003/0074264 A1 | 4/2003 | Hoffman |
| 2003/0074281 A1 | 4/2003 | Hoffman et al. |
| 2003/0074285 A1 | 4/2003 | Hoffman et al. |
| 2003/0074355 A1 | 4/2003 | Menninger et al. |
| 2003/0078787 A1 | 4/2003 | Hoffman et al. |
| 2003/0078818 A1 | 4/2003 | Hoffman et al. |
| 2003/0078819 A1 | 4/2003 | Hoffman et al. |
| 2003/0078827 A1 | 4/2003 | Hoffman |
| 2003/0078845 A1 | 4/2003 | Hoffman et al. |
| 2003/0078846 A1 | 4/2003 | Burk et al. |
| 2003/0078860 A1 | 4/2003 | Hoffman et al. |
| 2003/0078861 A1 | 4/2003 | Hoffman et al. |
| 2003/0083909 A1 | 5/2003 | Hoffman et al. |
| 2003/0083947 A1 | 5/2003 | Hoffman et al. |
| 2003/0088449 A1 | 5/2003 | Menninger |
| 2003/0088474 A1 | 5/2003 | Hoffman et al. |
| 2004/0083035 A1 | 4/2004 | Ellis |
| 2004/0193482 A1 | 9/2004 | Hoffman et al. |
| 2004/0201765 A1 | 10/2004 | Gammenthaler |
| 2006/0125680 A1* | 6/2006 | Thackray .......... G01S 7/41 342/54 |
| 2007/0185689 A1 | 8/2007 | Muraski et al. |
| 2007/0291127 A1 | 12/2007 | Prieto et al. |
| 2008/0111731 A1 | 5/2008 | Hubbard et al. |
| 2009/0262007 A1 | 10/2009 | Kelly |
| 2010/0106418 A1 | 4/2010 | Kindo et al. |
| 2010/0277714 A1 | 11/2010 | Pedersen et al. |
| 2010/0292886 A1 | 11/2010 | Szczerba et al. |
| 2011/0026007 A1 | 2/2011 | Gammenthaler |
| 2011/0221628 A1* | 9/2011 | Kamo .......... G01S 7/295 342/70 |
| 2012/0101711 A1 | 4/2012 | Furmston et al. |
| 2013/0151135 A1 | 6/2013 | Aubrey et al. |
| 2013/0214939 A1 | 8/2013 | Washlow et al. |
| 2013/0216094 A1 | 8/2013 | DeLean |
| 2013/0229644 A1 | 9/2013 | Chung et al. |
| 2013/0322697 A1 | 12/2013 | Grindstaff et al. |
| 2014/0309855 A1 | 10/2014 | Tran |
| 2014/0324291 A1 | 10/2014 | Jones et al. |
| 2016/0103150 A1 | 4/2016 | Lee |
| 2016/0174132 A1 | 6/2016 | Hynes |
| 2017/0146801 A1 | 5/2017 | Stempora |
| 2017/0160392 A1 | 6/2017 | Brisimitzakis et al. |
| 2017/0254880 A1* | 9/2017 | Smith .......... G01S 13/86 |
| 2019/0018129 A1 | 1/2019 | Walker et al. |
| 2019/0025336 A1 | 1/2019 | Mandava et al. |

FOREIGN PATENT DOCUMENTS

| | | |
|---|---|---|
| KR | 20090073221 | 7/2009 |
| WO | 96/26600 | 8/1996 |

OTHER PUBLICATIONS

Simicon, Cordon Brochure, Feb. 4, 2013, 4 pages.
GATSO Event Recorder, Jun. 17, 2013, 2 pages.
GATSO FT1 Flash, Jun. 19, 2013, 2 pages.
GATSO FT2 Flash, Jun. 19, 2013, 2 pages.
GATSO GS Camera, Jun. 26, 2013, 2 pages.
GATSO GT20 Camera, Jun. 26, 2013, 2 pages.
GATSO GTC GS11 Camera, Jun. 5, 2013, 2 pages.
GATSO Loopless Trigger Radar, Sep. 26, 2013, 2 pages.
GATSO Millia Brochure Mar. 22, 2012, 8 pages.
GATSO Parabolic Radar, Sep. 26, 2013, 2 pages.
GATSO RS-GS11, Jun. 26, 2013, 2 pages.
GATSO RT2 Radar, Oct. 7, 2013, 2 pages.
GATSO STATIO Brochure, Mar. 22, 2012, 8 pages.
GATSO RT3 Radar, Nov. 5, 2013, 2 pages.
GATSO Web Interface, Sep. 27, 2013, 2 pages.
GATSO XILIUM Back Office Brochure, Mar. 22, 2012, 8 pages.
Skolnik, et al., "Introduction to Radar Systems", 1962, McGraw-Hill Book Company, 6 pages.
Westphal, et al., "35-GHz-Doppler Radar for Law Enforcement Agencies in Europe", Microwave Symposium Digest, 1988, IEEE MTT-S International, May 25-27, 1988, vol. 2, pp. 1031-1033.
Chiu, et al., "Automatic Traffic Surveillance System for Vision-Based Vehicle Detection and Tracking", Chun Cheng Institute of Technology, National Defense University, 2007, 19 pages.
Shirbacheh, et al., "Microscopy, Electrochemistry, and Conductivity Analyzer (MECA) Payload on Mars '07 Phoenix Lander", IEEEAC Paper #1496, Version 2, Jan. 20, 2004, 13 pages.
Simicon-Service Ltd., Price List effective Mar. 1, 2012, 1 page.
Multanova, MultaRadar CD, Feb. 26, 2013, 2 pages.
Multanova, Jenoptik TraffiStar S330, Feb. 26, 2013, 2 pages.
Multanova TraffiStar SR 520, Feb. 26, 2013, 2 pages.

(56) References Cited

OTHER PUBLICATIONS

Multanova TraffiStar SR590, Feb. 26, 2013, 2 pages.
Oculii LLC, Applied Concepts Meeting, General Information, May 6, 2013, 12 pages.
Oculii LLC, Visdar-1000, May 6, 2013, 3 pages.
Oculii LLC, Visdar-1000, May 6, 2013, 24 pages.
Oculii LLC, Visdar-1000, May 6, 2013, 2 pages.
Polcam Stalker Phodar Model SE-1, Feb. 26, 2013, 2 pages.
Polcam Smart Eye ST-1, User's Manual, Jul. 2013, 51 pages.
Polcam Smart Eye Radar, Feb. 26, 2013, 4 pages.
Polcam Smart Eye Radar Type Sauron, User's Guide, Feb. 2013, 44 pages.
Ramet AD9C Radar Speed Camera, System Layout, Feb. 27, 2013, 1 page.
Ramet AD9C Car Trunk, Feb. 27, 2013, 1 page.
Ramet AD9C Dashboard and Tablet, Feb. 27, 2013, 1 page.
Ramet AD9C Dashboard Display, Feb. 27, 2013, 1 page.
Ramet AD9C Front-Auto, Feb. 27, 2013, 1 page.
Ramet AD9C New Features, Feb. 27, 2013, 1 page.
Ramet AD9C Police Speed Camera Line, Feb. 27, 2013, 2.
Ramet AD9C Police Speed Camera Line, Feb. 27, 2013, 1 page.
Ramet AD9O Cabinet Block Diagram, Feb. 27, 2013, 1 page.
Ramet AD9O Container Block Diagram, Feb. 27, 2013, 1 page.
Ramet AD9O Opened, Feb. 27, 2013, 1 page.
Ramet AD9O Photo, Feb. 27, 2013, 1 page.
Ramet AD9C Police Speed Camera Line, Feb. 27, 2013, 2 pages.
Ramet AD9T Radar Speed Camera Block Diagram, Feb. 27, 2013, 1 page.
Ramet AD9T in Car Trunk, Feb. 27, 2013, 1 page.
Ramet AD9T on Tripod, Feb. 27, 2013, 1 page.
Ramet AD9T Travel Case, Feb. 27, 2013, 1 page.
Ramet AD9T with Tablet PC, Feb. 27, 2013, 1 page.
Ramet AD9T Police Speed Camera Line, Feb. 27, 2013, 2 pages.
Ramet Archiv 45 screenshot, Feb. 27, 2013, 1 page.
Ramet Archiv 45 Offence Report, Mar. 21, 2008, 1 page.
Ramet Archiv 45 Police Speed Camera Line, Feb. 27, 2013, 1 page.
Ramet Police Speed Camera Line Remote Transmission, Feb. 27, 2013, 1 page.
Ramet AD9 Remote Transmission Network Example, Feb. 27, 2013, 1 page.
Ramet AD9 Police Speed Camera Line Specs, Feb. 27, 2013, 2 pages.
REDFLEX Traffic Systems REDFLEXspeed, 2012, 4 pages.
Sensys SSS Fixed Speed Enforcement, Feb. 26, 2013, 3 pages.
Sensys SSS Droplet Cabinet, Feb. 26, 2013, 4 pages.
Sensys MSSS II, Feb. 26, 2013, 4 pages.
Isbak Product Documents, May 6, 2013, 12 pages.
Safran MESTA 1000-1200, May 22, 2013, 2 pages.

* cited by examiner

SYSTEM FOR DETERMINING SPEED AND RELATED MAPPING INFORMATION FOR A SPEED DETECTOR

CROSS REFERENCE TO RELATED APPLICATION

This application claims priority to U.S. Provisional Patent Application No. 62/535,711, filed Jul. 21, 2017, entitled "Absolute Speed and Mapping Lidar," the entire contents of which are hereby fully incorporated herein by reference for all purposes.

TECHNICAL FIELD

The present disclosure relates generally to range/Doppler-measurement-based speed detection devices and, more specifically, to systems and methods used to efficiently and effectively determine speed and relevant mapping and imaging information.

BACKGROUND

Handheld LIDAR speed detectors are tools available to law enforcement to assist in enforcing traffic laws. In some models, the speed detecting LIDAR can be equipped with cameras that allow for the capture, storage, and transfer of still-shots of the license plate, vehicle, and surrounding scene to provide further evidentiary support Furthermore, in some models, video capabilities are provided to provide evidence of the traffic infraction. These additional features can be expensive and not all law enforcement departments are willing to spend for such enhanced capabilities. However, the need for these capabilities still exist.

The present disclosure, therefore, provides novel and non-obvious solutions that when used with these non-enhanced detection devices result in the devices providing similar features but at a significantly reduced cost which can be attractive for some market segments.

SUMMARY

A system is provided that can improve upon the determination, capture, and communications of evidentiary information when used in combination with LIDAR or RADAR detectors. The improvement can provide enhanced capabilities at a reasonable cost structures. The system can interface with other system components of the detector and in response to receiving evidentiary data of a traffic violation can perform mapping and imaging functions that result in the evidentiary information being projected upon mapping and/or imaging data, e.g. mapping and/or imaging data provided by a third party. This approach provides for enhanced LIDAR or RADAR speed detector features without the added expense found in detectors that use on-device imaging and video capabilities.

In an embodiment, the present disclosure is directed to a system for determining speed and related mapping information of a moving object. The system includes a storage resource and a processor communicatively coupled to the storage resource, wherein the processor executes application code instructions that are stored in the storage resource. The system processes a plurality of time of flight data over a measurement time interval and determines a plurality of ranges between the system and the moving object for each time of flight data. The system can calculate speed of the moving object based, in part, off of the plurality of ranges.

In response to receiving a user initiated lock command, the system determines system coordinates and associates system coordinates with at least one of speed, a change in range of the moving object, its azimuthal orientation angle, time, and angular swivel rate of the system provided from the calculation of the speed. The system can receive a map or satellite image associated with the system coordinates in response to sending a query with the system coordinates to a map database. The system can communicate the map and the at least one of the speed, the change in range of the moving object, its azimuthal orientation angle, time, and the angular swivel rate of the system.

In another embodiment, the system can determine a linear regression curve-fit on the plurality of time of flight data over the measurement time interval. The system can determine a radial velocity associated with the plurality of time of flight data over the measurement time interval from the slope of the linear regression curve-fit. The system can detect angular swivel rate ($\omega = d\theta/dt$) of the system using at least one of a gyro and magnetometer. The system can then determine a tangential velocity for each time of flight data over the measurement time interval by multiplying each range with angular rate ($\omega = d\theta/dt$). The system calculates speed by causing the system to calculate the square root of the addition of the square of the radial velocity and square of the tangential velocity.

In yet another embodiment, the system can determine a linear regression curve-fit on the plurality of time of flight data over the measurement time interval. The system can measure perpendicular distance (L) between system and direction of travel of the object. The system can calculate instantaneous distance (D) in the direction of motion of the object for each range (R) by subtracting square of a perpendicular distance (L) from square of R and taking square root of the result. The system can calculate speed by determining slope of modified linear regression curve-fit over the measurement time interval for D.

In another embodiment, the system can wirelessly communicate at least one of the speed, the change in range of the moving object, azimuthal orientation angle, time, and angular swivel rate of the system to a remote GPS enabled device; send a GPS request command to a GPS application executing on a GPS receiver in order to determine system coordinates; wherein the GPS application executing on the GPS receiver is executing on either one of a remote GPS receiver and a GPS receiver local to the system. In addition, the system can query a remote map database or local map database with the system coordinates in order to receive a relevant map.

In yet another aspect, the system can add legends to the map to include information identifying at least one of the speed, the change in range of the moving object, time, and, optionally, angular rate; and overlay tracking information of the moving object; wherein the tracking information includes at least one color coded track and each color coded track identifies the speed.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 3 is a diagram depicting a LIDAR detector, object in motion, signal, distances and motion outline, and associated cosine effect realized when using the LIDAR detector in AM or MM, and in certain positions, according to certain example embodiments;

DETAILED DESCRIPTION OF PREFERRED EMBODIMENTS

Figure 1:
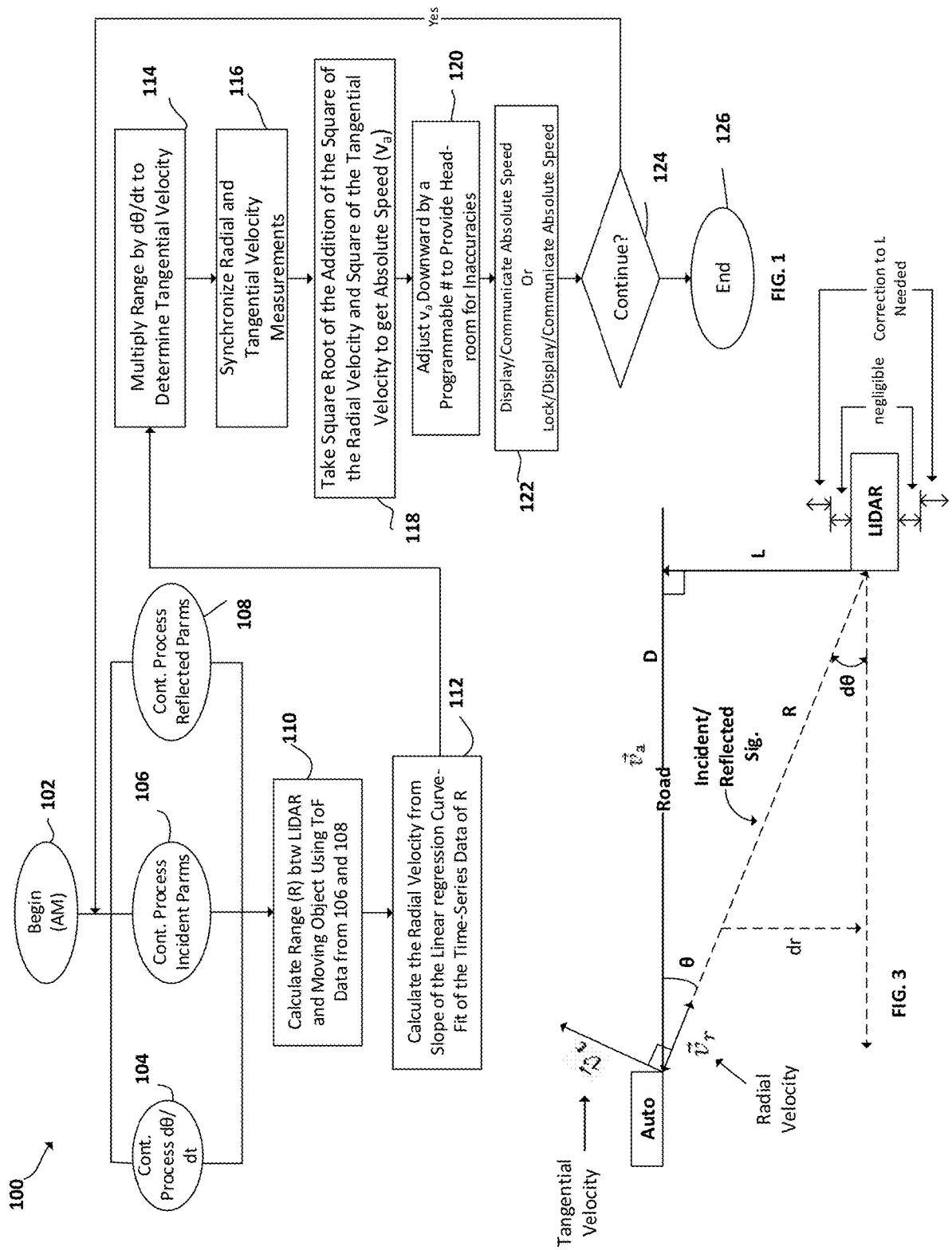
FIG. 1 is a flow chart depicting an Automatic Mode (AM) algorithm for determining absolute speed, according to certain example embodiments.

The example embodiments presented herein are directed to systems, methods, and computer program products for determining and provisioning speed and mapping information of a moving object.

In a first Automatic Mode (AM) method, the radial velocity of the moving object can be determined from the slope obtained by performing a linear regression curve-fit on the time-series of the time-of-flight data. The tangential velocity can be calculated by multiplying the range value with the angular velocity. With the measuring device tracking a point on the object, the angular velocity of the target track in its plane of motion with respect to the line-of-sight equals the swivel rate of the device. The absolute speed can then be determined by taking the square root of the sum of the square of the radial velocity and the square of the tangential velocity. Alternatively, in a Manual Mode (MM), the absolute speed can be determined to be the slope of the linear regression curve-fit on the time-series data of the distances, D, in the direction of motion. The instantaneous distances, D, are the square root of the subtraction of a square of a perpendicular distance (L) between the detector and a path of travel of the moving object, from a square of a line-of-sight range value (R).

In either method, a lock command can be issued by the user, e.g. when the user determines an infraction has been committed, and, in response, coordinates of the system can be determined and associated with the speed. A map and/or satellite image can then be queried for and received based upon the system coordinates and the map and/or satellite image, speed, and speed related parameters can be communicated to either a display or a remote server system, or both. In addition, it should be understood that, in order to preserve an objective of the embodiments, 3rd party services can be used to obtain relevant data to perform the functions described herein.

As example use cases, an area of use of the improved LIDAR detector is in the area of Traffic Law-Enforcement (TLE). However, there are a myriad of other applications of the improved LIDAR. For example, monitoring potential moving violations in the area of recreational boating, support vehicles & aircraft on airport tarmacs, drones, and railcars. Enforcing a speed-limit complying environment in water bodies with recreational watercraft can improve safety. Minimizing collisions on airport tarmacs that are host to high asset value airplanes can be made possible by accurate speed measurements from any position. Ensuring that railcars travel at the prescribed speed limits in railyards helps maintain appropriately damped shunting operations at freight railroad junctions. Additionally, with the improved capability of the LIDAR, TLE officers are not constrained by disadvantageous vantage positions due to construction work, absence of roadway shoulders, obstructions, highway overpass stalking positions, and such. Furthermore, the improved detector can allow officers to be in more discrete positions that would not provide drivers advance notice to brake on sighting a targeting officer. As such, the improvement in the LIDAR or RADAR detectors can obtain speed violation boosts of as much as 20% or more even with cosine angles in the double digits. The gap between absolute and relative speeds widen with increasing cosine angle and object speeds. Furthermore, moving violations can include intrusions into restricted areas or zones with the overlay of target position and motion onto maps.

Referring now to FIG. 1, a flow chart depicting an Automatic Mode (AM) algorithm for determining absolute speed is illustrated, according to certain example embodiments, denoted generally as 100. AM algorithm 100 can be implemented in hardware or a suitable combination of hardware and software, such as in firmware operating in conjunction with one or more programmable circuit elements of a system for processing LIDAR or RADAR, such as digital signal processors, field programmable gate arrays (FPGAs), central processing units (CPUs) or the like. At block 102, the AM algorithm begins, e.g. upon powering up the system. In an example use, a LIDAR or RADAR detector implementing the use of the AM algorithm may focus the detector at an automobile moving down the road to track its speed wherein upon, e.g. in the case of the LIDAR, a laser beam is directed towards the vehicle. If the detector is not in a direct line of sight of the automobile but at an angle, the cosine effect of the angle needs to be considered in determining the absolute speed. This determination can be done by generating an angular swivel rate (ω) of the detector, e.g. by using the gyroscope and, optionally, a magnetometer wherein a weighted average of the two readings could be taken. Note that the linear component of the motion of the LIDAR detector does not impact the angular rate measurement of the object being tracked. At steps 104, 106, and 108, the angular rate (ω), equation 1, incident parameters, and reflected parameters, respectively, are processed, continuously and in real-time.

$$\omega = (d\theta/dt) \quad \text{Equation (1)}$$

Figure 4A:
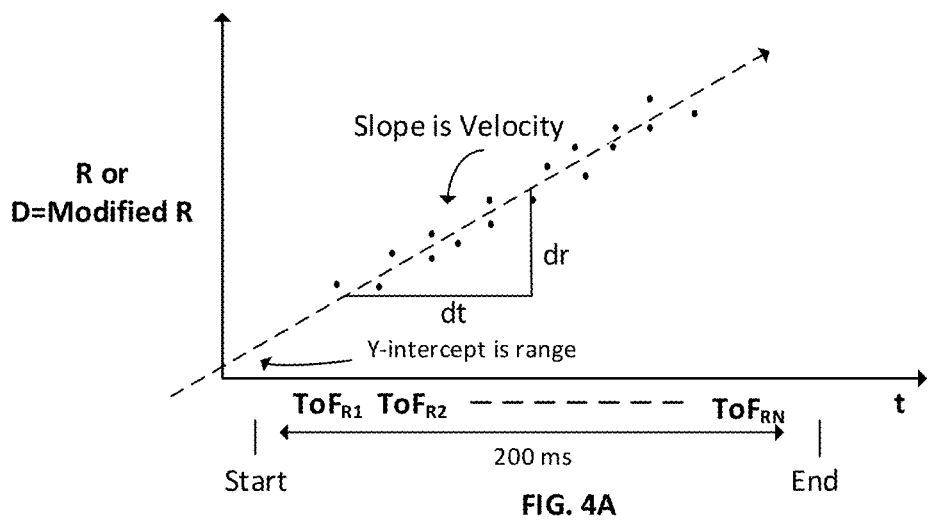
FIG. 4A is a diagram depicting a linear regression curve fit chart, according to certain example embodiments
Figure 4B:
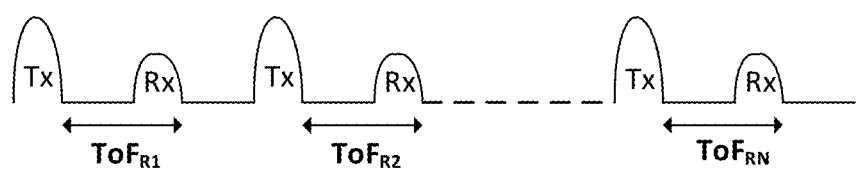
FIG. 4B is a diagram depicting a time of flight signaling data, according to certain example embodiments.

Algorithm 100 continues at block 110 where the range (R) is calculated between the LIDAR detector, e.g., and the automobile using time-of-flight data from Transmitted (Tx) and Received (RX) data, (see FIGS. 4A and 4B), derived from steps 106 and 108. Next at block 112, a linear regression curve-fit on the time series data of R from 110 is performed, and the radial speed dR/dt (equation 2) can be calculated from its slope (see FIGS. 4A and 4B).

$$\vec{v}_r = (dR/dt) \qquad \text{Equation (2)}$$

The algorithm continues at block 114 where the range (R) is multiplied by dθ/dt to determine tangential velocity ($\vec{v}_t$), equation 3.

$$\vec{v}_t = R\omega = R d\theta/dt \qquad \text{Equation (3)}$$

At block 116, the radial and tangential velocity measurements are synchronized to help mitigate time discrepancies between the two that can affect the accuracy of the absolute speed. In other words, a delay or advancement of the time-series of the tangential velocities is done to synchronize the two components. The algorithm 100 continues at block 118 where the square root is taken of the addition of the square of the radial velocity and the square of the tangential velocity to get the absolute speed, $v_a$, see equation 4.

$$|\vec{v}_a| = \sqrt{\vec{v}_r^2 + \vec{v}_t^2} \qquad \text{Equation (4)}$$

At block 120, in case of speed enforcement where the benefit of doubt is given to the object being tracked, the calculated absolute speed can be adjusted downwards by a programmable number to a value no less than the measured radial relative speed, $v_a$, cos θ, to provide head-room for inaccuracies in angular rate measurement and time synchronization of the two orthogonal components. The algorithm 100 then continues at block 122 where the absolute speed is either displayed or communicated over a network. In addition, a user can initiate a lock command, for instance when a traffic infraction has been realized, and display or communicate the absolute speed and associated parameters (R, t, θ, ΔR, ω, and D) over a network interface, such as WIFI or Bluetooth, to a responding controller and algorithm, see FIG. 5 and FIG. 6. At block 124, the algorithm 100 determines if processing of detector data should continue, e.g. based on a lock command or other user initiated termination request. If so, the algorithm 100 returns to continue processing parameters at blocks 104, 106, and 108, otherwise the algorithm 100 ends at block 126.

FIG. 3 is a diagram illustrating a LIDAR detector targeting an automobile. Illustrated in the diagram is the tangential velocity ($\vec{v}_t$), radial velocity ($\vec{v}_r$), incident reflected signals, actual Line of Sight distance (R), i.e. range, an instantaneous distance (D), i.e. in direction of motion of the moving object, a perpendicular distance (L) between the LIDAR detector and a road where L and D intersect, and negligible and non-negligible distances for which L should or should not be recalculated. For example, movement of about 2 feet in the perpendicular direction may require update of distance L. FIG. 3 is provided to help facilitate understanding of the algorithms presented herein with respect to FIG. 1 and FIG. 2.

In this particular example, the LIDAR detector is at an angle (θ) to the instantaneous direction (D) of travel of the automobile. As a result of the cosine effect, the typically measured radial relative speed is the reduced value $v_a$ cos θ, with the reduction increasing with the value of θ. The cosine effect, cos θ, can be corrected for, using the algorithms described herein, in order to get an accurate calculation of the absolute speed at which the vehicle is traveling. The angular rate (ω=dθ/dt) can be determined by the vector addition of the angular swivel rates in the two axes that are perpendicular to the line of sight of the LIDAR, by either: calculating the angular rate (dθ/dt); processing the angular rate (dθ/dt) received from a gyroscope; processing the angular rate (dθ/dt) from a magnetometer, or using any combination and, e.g., a weighted average to get the best results. The detected angular swivel rate time-series data can be smoothed by filtering.

Figure 2:
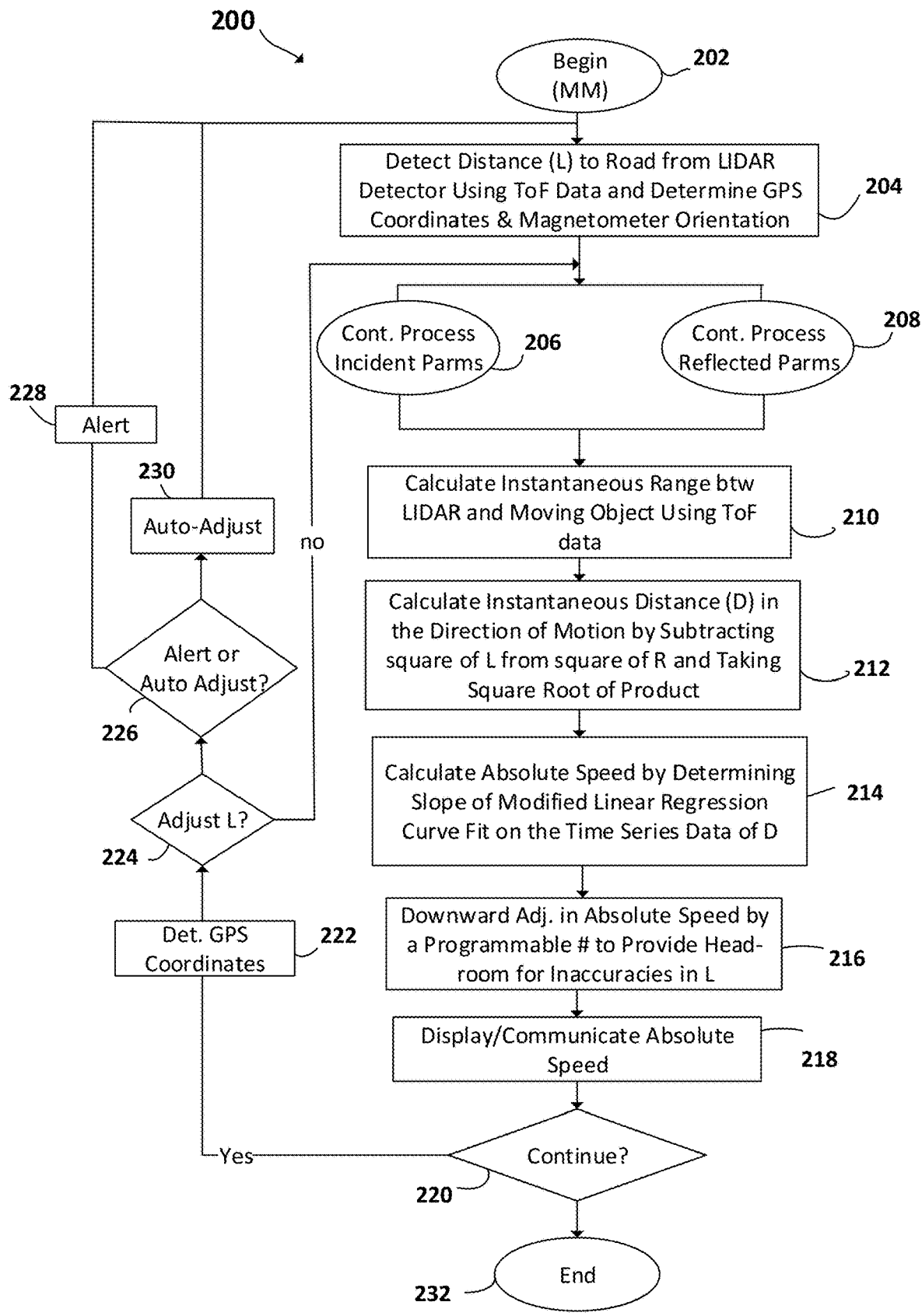
FIG. 2 is a flow chart depicting a Manual Mode (MM) algorithm for determining absolute speed, according to certain example embodiments.

Furthermore, sources that can cause inaccuracies in the measurement of the absolute speed can be caused by inaccurate measurements in the perpendicular distance L, as is used in MM that is discussed in relation to FIG. 2, and the source of measurement of the angular velocity ω, e.g. when using gyro and magnetometer, or the object being tracked is on a winding or curved road, or the automobile being tracked is changing lanes. Backing off or adjusting downwards, as described above in relation to blocks 116 and 120 and discussed in FIG. 2, can be beneficial.

In addition, if the measure of L is known, and the LIDAR is moved beyond a threshold determined by the speed accuracy tolerance after said measurement, the operator can either be notified by visual and/or audio alerts so that the measure can be retaken, or the measure can automatically be updated, e.g. using the change in location coordinates and orientation before and after movement recorded from GPS and magnetometer respectively.

Referring now to FIG. 2, a flow chart depicting a Manual Mode (MM) algorithm for detecting absolute speed is illustrated, according to certain embodiments, and denoted generally as 200. MM algorithm 200 can be implemented in hardware or a suitable combination of hardware and software, such as in firmware operating in conjunction with one or more programmable circuit elements of a system for processing LIDAR or RADAR, such as digital signal processors, field programmable gate arrays (FPGAs), central processing units (CPUs) or the like. The algorithm 200 begins at 202 wherein the algorithm is executed, e.g., when powering up or switching between AM and MM. The algorithm 200 continues when the operator of the LIDAR detector targets the road from position in order to determine the perpendicular distance (L) to the road, e.g using time of flight data for incident and reflected parameters, and capture GPS coordinates and magnetometer orientation of the LIDAR, block 204. The algorithm 200 continues processing incident parameters and reflected parameters, in block, 206 and 208, respectively, or simply just ToF data. Algorithm 200 continues at block 210 where the range (R) is calculated between the LIDAR detector, e.g., and the automobile by using ToF time series data from 206 and 208, e.g. using the same techniques described in reference to block 110 and FIGS. 4A and 4B. The algorithm 200 continues at block 212 where the instantaneous Distance (D) is calculated for each point in the curve by subtracting square of L from square of R and taking square root of product, see equation (5).

$$D = \sqrt{R^2 - L^2} \qquad \text{Equation (5)}$$

The algorithm 200 continues at block 214 where the absolute speed is determined by applying a linear regression curve-fit to the new time-series data D, and calculating the slope of the curve-fit to determine absolute speed ($v_a$). At block 216, as was the case in the AM mode, in case of speed enforcement where the benefit of doubt is given to the vehicle, the calculated absolute speed, $v_a$, is adjusted downwards by a programmable number to a value no less than the measured radial relative speed, $v_a$ cos θ, to provide headroom for inaccuracies in the measurement of the perpendicular distance L. The algorithm 200 then continues at block 218 where the absolute speed is either displayed or communicated over a network. In addition, a lock command can be initiated by the user, e.g. when an infraction has occurred. In response, the absolute speed and at least one of the related parameters (R, t, θ, ω, ΔR, and D) can be communicated, e.g. over a wireless channel, to the controller and algorithm described in reference to FIGS. 5 and 6. At block 220, the algorithm 200 determines if processing of detector data should continue, e.g is LIDAR still active or if LIDAR data is being received. If so, at block 222 the algorithm 200 captures GPS coordinates and magnetometer orientation and determines from the original captured coordinates if any change in position is present and if so, whether it is greater than a programmable threshold, block 224. If determined that the values of L does not need to be adjusted, algorithm 200 returns to continue processing ToF data, blocks 206 and 208. If it is determined that the threshold value has been exceeded, block 224, either the operator is alerted, e.g. by an alarm, a displayed message, or a combination of the two, block 226 and block 228, or the value of L is recalculated automatically using the new GPS coordinates and magnetometer orientation, block 230. Otherwise, from decision block 220, algorithm 200 can end at block 232.

In MM, it can be easier to obtain a speed track using linear regression curve-fit on the time series data of D as compared to the time-series data of R. For example, even when the object being tracked is moving at a constant velocity the time series data for D is a straight line whereas that of R follows a sinusoidal curve.

Figure 5:
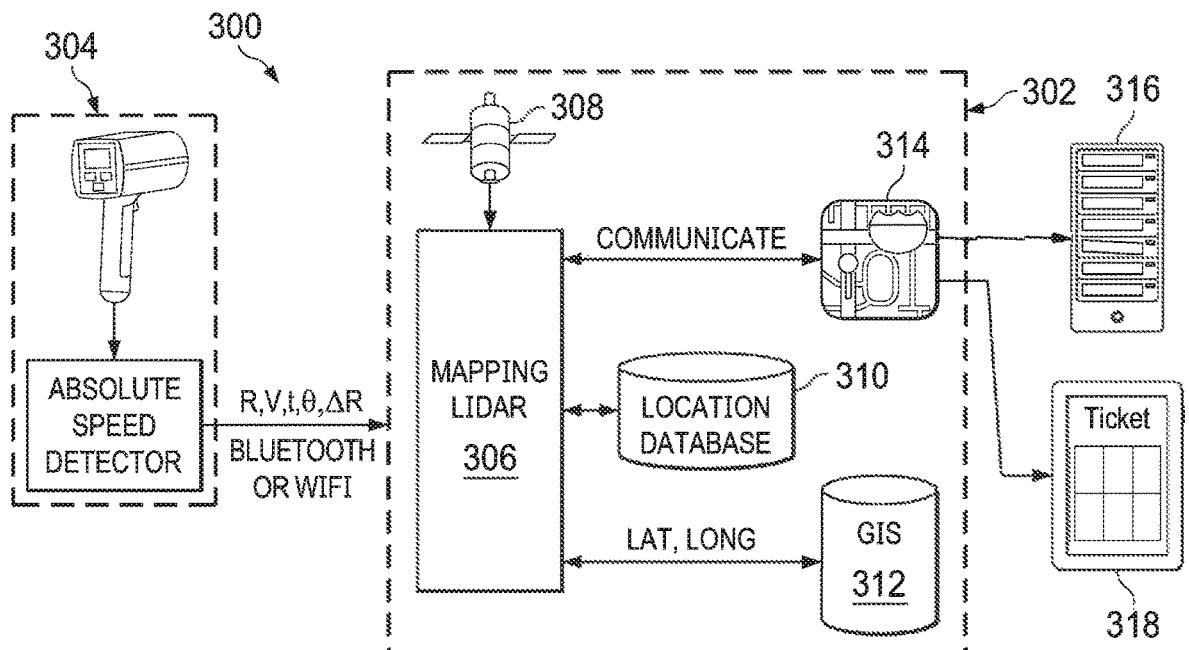
FIG. 5 is a flow diagram depicting a speed detector system with mapping capabilities, according to certain embodiments.

Referring now to FIG. 5, a flow diagram of a speed detector system with mapping capabilities is illustrated, according to certain embodiments, and denoted generally as 300. The system 300 includes mapping mechanism 302 communicably coupled with a LIDAR detector 304, although in another embodiment this could be a RADAR detector, with, optionally, absolute speed detector as defined in algorithms 100 or 200. LIDAR detector 304 sends at least one of the following parameters collected from the speed detector algorithms 100 or 200: Range (R), speed (V), time (t), azimuth angular orientation θ, angular swivel rate (=dθ/dt), the change in Range (ΔR) with respect to time, and instantaneous distance (D). The LIDAR detector 304 can communicate the parameters over Bluetooth or Wi-Fi, although other communication mechanisms can be used, to the mapping mechanism 302. The mapping mechanism 302 can be used, e.g., on a remote GPS enabled device, such as a laptop or smartphone. Although, it should be understood the mapping mechanism 302 could be integrated with the LIDAR detector 304 wherein communications would be over computing bus.

The mapping mechanism 302 includes mapping LIDAR algorithm controller 306, GPS API (Application Protocol Interface) 308, location database 310, a Geographic Information System (GIS) database 312, and LIDAR map communications API 314. The controller 306 receives at least one of the R, V, t, θ, ω, ΔR, and D over a communications interface from the speed detector 304, e.g. when the speed of a vehicle is locked by a user. The controller 306, in response, initiates the GPS API 308 for obtaining latitude and longitude of the system 300. Upon receipt of the coordinates, the at least one of R, V, t, θ, ω, ΔR, and D and coordinates are stored and associated together in location database 310. The controller 306 can then retrieve mapping information and/or a satellite image from the GIS database 312 by, e.g., issuing a GPX command along with the latitude and longitude of the system. Upon receipt of the mapping data, the controller 302 can communicate the map and/or imaging data over the communications API 314. Communications of the map and/or imaging data over API 314 can be communications to a back end remote server 316 for storage and processing and/or to a video graphics API for displaying the mapping data on a display 318. The map can be a graphics file illustrating a grid like layout of the relevant roads and associated terrain or can be a satellite image of the actual roads and terrain. In addition, an overlay of information, e.g. information from at least one of R, V, t, θ, ω, ΔR, and D and associated tracking data, e.g. color coded, can be provided with the graphics file or image, see FIG. 7. It should be understood, however, that the mapping mechanism 302, or at least in part, can be implemented on the detector 304. It should also be understood that in certain embodiments the GPS satellite transceiver can be implemented remotely, e.g. the mapping mechanism and GPS API 308 can be embodied in the detector 304 and the GPS transceiver embodied in a remote device, e.g. a personal computer in a patrol car. Additionally, the GIS database 312 can be a database service provided by a remote 3$^{rd}$ party service provider.

Figure 6:
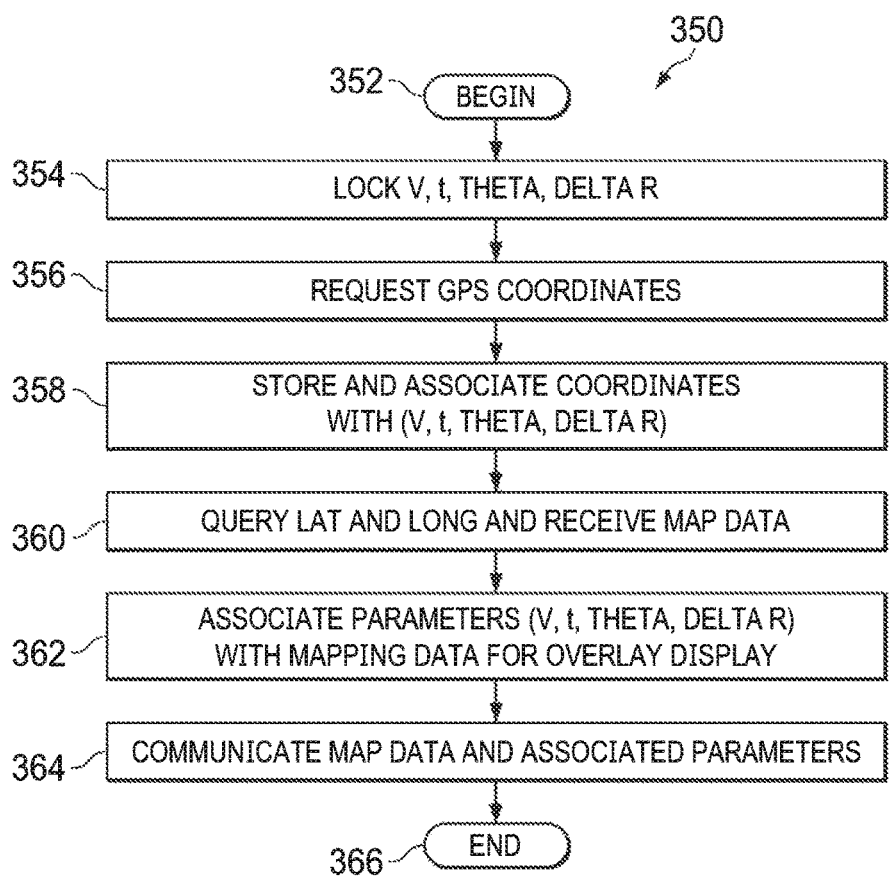
FIG. 6 is a flow chart depicting a mapping controller algorithm, according to certain example embodiments.
Figure 7:
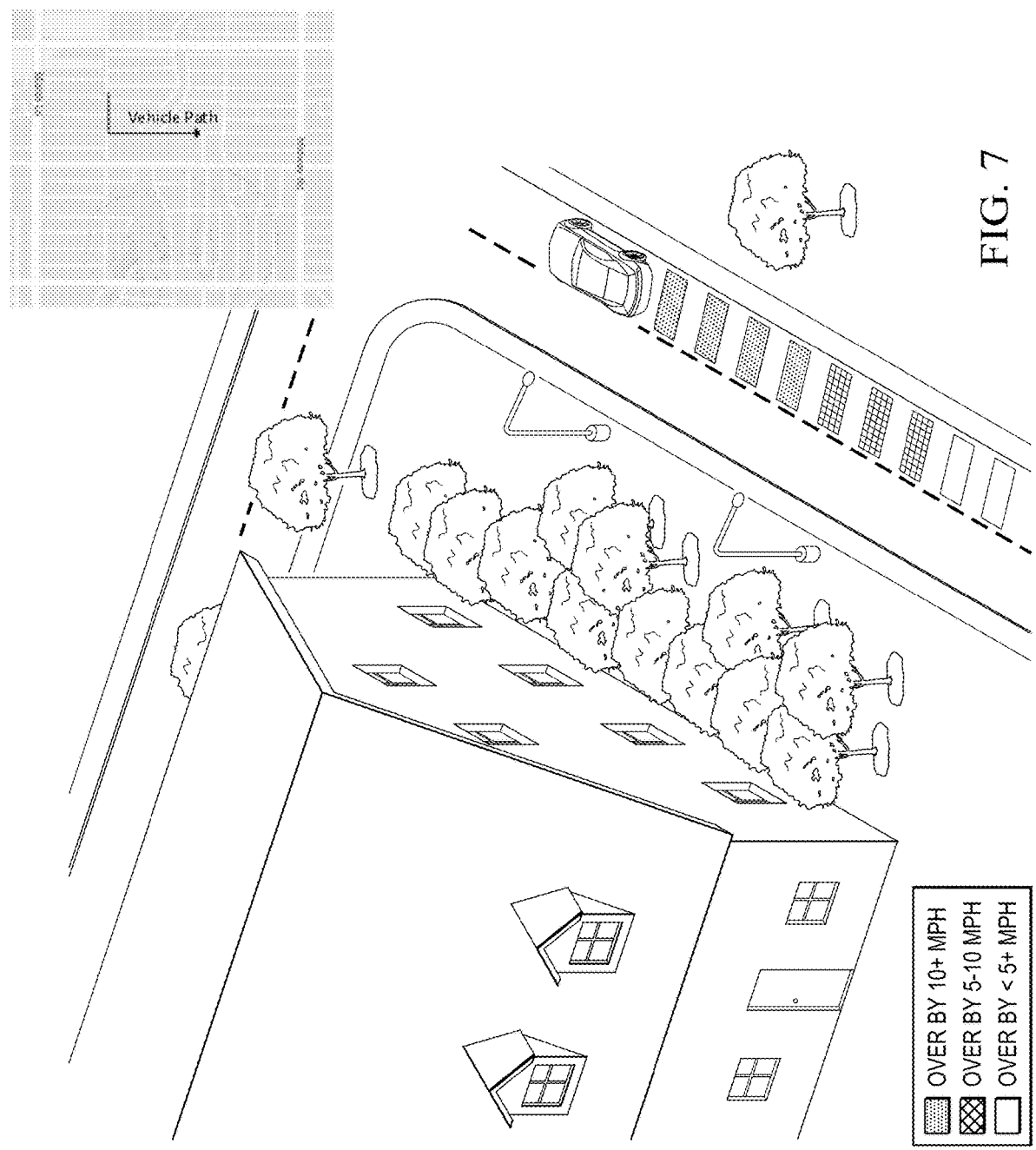
FIG. 7 is a diagram depicting a satellite image file with overlay speed and associated parameters, according to certain example embodiments.

Referring now to FIG. 6, a flow chart of a mapping controller algorithm is illustrated, according to certain example embodiments, and denoted generally as 350. Controller algorithm 350 begins at block 352, e.g. when the speed detector algorithm is executed. Upon receiving a lock command from either algorithm 100 or 200, block 354, along with the at least one of R, V, t, θ, ω, ΔR, and D, the algorithm initiates a GPS coordinates request command, block 356. Upon receipt of the coordinates, the coordinates and the at least one parameter can be stored and associated together in the database. Next, a query can be generated and sent to a GIS database along with the coordinates, block 358. In response, mapping data or an imaging data is returned, block 360. Although, it should be understood that the database for storing and associating the coordinates and parameters may be optional. In other words, the data can be stored in-line. Next, block 362, at least one of the R, V, t, θ, ω, ΔR, and D parameters can be associated with the mapping data or imaging data so that the mapping data or imaging data includes overlaid parameter, as illustrated in FIG. 7. In addition, speed limit data can be entered, or otherwise obtained based on the system coordinates, e.g. from location database, and displayed along with the other parameters. The mapping data and overlay data is then communicated to a display and/or to a backend server system, block 366. The process then ends, block 364, by returning control to the appropriate speeding detector algorithm.

The relative positions (over time) with respect to the LIDAR/detector of the tracked object (vehicle) in a 2D coordinate plane (e.g. using a polar coordinate system) can be uniquely determined from the regular range calculation R and the azimuthal orientation theta (θ). With the GPS coordinates of the system/LIDAR/unit known, the absolute GPS coordinates (over time) of the tracked object can be determined by applying the relative position adjustments. In the case when the GPS receiver is in the patrol vehicle (and not the LIDAR), to which the parameters (R, v, θ, ω, and time) are transmitted/transferred, the relative position of the patrol vehicle with respect to the handheld LIDAR can be initially determined by shooting the patrol vehicle with the LIDAR from the vantage position of the LIDAR, and capturing its relative distance and azimuth angle position. The absolute GPS coordinates of the tracked object can then be determined by one more relative position adjustment.

Figure 8:
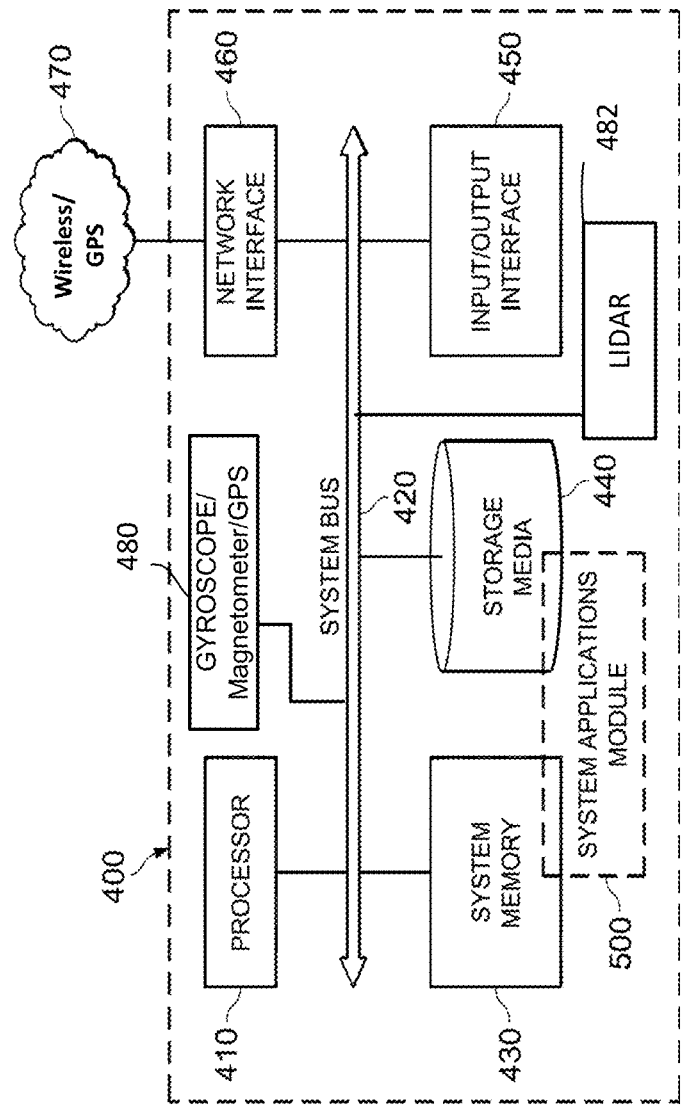
FIG. 8 is a block diagram depicting a computing machine and system applications, in accordance to certain example embodiments.

Referring now to FIG. 8, a computing machine 400 and a system applications module 500 is illustrated, in accordance with example embodiments. The computing machine 400 can correspond to any of the various computers, mobile devices, laptop computers, servers, embedded systems, or computing systems presented herein. The module 500 can comprise one or more hardware or software elements designed to facilitate the computing machine 400 in performing the various methods and processing functions presented herein. The computing machine 400 can include various internal or attached components such as a processor 410, system bus 420, system memory 430, storage media 440, input/output interface 450, a network interface 460 for communicating with a network 470, e.g. cellular/GPS, a MEMS unit 480, which can include a gyroscope, and/or magnetometer and/or GPS, and LIDAR unit 482 with appropriate laser sensors, and/or RADAR unit.

The computing machine 400 can be implemented as a conventional computer system, an embedded controller, a laptop, a server, a mobile device, a smartphone, a wearable computer, a customized machine, any other hardware platform, or any combination or multiplicity thereof. The computing machine 400 can be a distributed system configured to function using multiple computing machines interconnected via a data network or bus system.

The processor 410 can be designed to execute code instructions in order to perform the operations and functionality described herein, manage request flow and address mappings, and to perform calculations and generate commands. The processor 410 can be configured to monitor and control the operation of the components in the computing machine 400. The processor 410 can be a general purpose processor, a processor core, a multiprocessor, a reconfigurable processor, a microcontroller, a digital signal processor ("DSP"), an application specific integrated circuit ("ASIC"), a controller, a state machine, gated logic, discrete hardware components, any other processing unit, or any combination or multiplicity thereof. The processor 410 can be a single processing unit, multiple processing units, a single processing core, multiple processing cores, special purpose processing cores, co-processors, or any combination thereof. According to certain embodiments, the processor 410 along with other components of the computing machine 400 can be a virtualized computing machine executing within one or more other computing machines.

The system memory 430 can include non-volatile memories such as read-only memory ("ROM"), programmable read-only memory ("PROM"), erasable programmable read-only memory ("EPROM"), flash memory, or any other device capable of storing program instructions or data with or without applied power. The system memory 430 can also include volatile memories such as random access memory ("RAM"), static random access memory ("SRAM"), dynamic random access memory ("DRAM"), and synchronous dynamic random access memory ("SDRAM"). Other types of RAM also can be used to implement the system memory 430. The system memory 430 can be implemented using a single memory module or multiple memory modules. While the system memory 430 is depicted as being part of the computing machine 400, one skilled in the art will recognize that the system memory 430 can be separate from the computing machine 400 without departing from the scope of the subject technology. It should also be appreciated that the system memory 430 can include, or operate in conjunction with, a non-volatile storage device such as the storage media 440.

The storage media 440 can include a hard disk, a floppy disk, a compact disc read-only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 440 can store one or more operating systems, application programs and program modules, data, or any other information. The storage media 440 can be part of, or connected to, the computing machine 400. The storage media 440 can also be part of one or more other computing machines that are in communication with the computing machine 400 such as servers, database servers, cloud storage, network attached storage, and so forth.

The system applications module 500 can comprise one or more hardware or software elements configured to facilitate the computing machine 400 with performing the various methods and processing functions presented herein, i.e. algorithms 100, 200, and 350. The module 500 can include one or more algorithms or sequences of instructions stored as software or firmware in association with the system memory 430, the storage media 440, or both. The storage media 440 can therefore represent examples of machine or computer readable media on which instructions or code can be stored for execution by the processor 410. Machine or computer readable media can generally refer to any medium or media used to provide instructions to the processor 410. Such machine or computer readable media associated with the module 500 can comprise a computer software product. It should be appreciated that a computer software product comprising the module 500 can also be associated with one or more processes or methods for delivering the module 500 to the computing machine 400 via the network 470, any signal-bearing medium, or any other communication or delivery technology. The module 500 can also comprise hardware circuits or information for configuring hardware circuits such as microcode or configuration information for an FPGA or other PLD. In one exemplary embodiment, module 800 can include algorithms capable of performing the functional operations described by the flow charts and computer systems presented herein for performing an on-line payment.

The input/output ("I/O") interface 450 can be configured to couple to one or more external devices, to receive data from the one or more external devices, and to send data to the one or more external devices. Such external devices along with the various internal devices can also be known as peripheral devices. The I/O interface 450 can include both electrical and physical connections for coupling the various peripheral devices to the computing machine 400 or the processor 410. The I/O interface 450 can be configured to communicate data, addresses, and control signals between the peripheral devices, the computing machine 400, or the processor 410. The I/O interface 450 can be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 450 can be configured to implement only one interface or bus technology. Alternatively, the I/O interface 450 can be configured to implement multiple interfaces or bus technologies. The I/O interface 450 can be configured as part of, all of, or to operate in conjunction with, the system bus 420. The I/O interface 450 can include one or more buffers for buffering transmissions between one or more external devices, internal devices, the computing machine 400, or the processor 410.

The I/O interface 450 can couple the computing machine 400 to various input devices including mice, touch-screens, scanners, electronic digitizers, sensors, receivers, touchpads, trackballs, cameras, microphones, keyboards, any other pointing devices, or any combinations thereof. The I/O interface 450 can couple the computing machine 400 to various output devices including video displays, speakers, printers, projectors, tactile feedback devices, automation control, robotic components, actuators, motors, fans, solenoids, valves, pumps, transmitters, signal emitters, lights, and so forth.

The computing machine 400 can operate in a networked environment using logical connections through the network interface 460 to one or more other systems or computing machines across the network 470. The network 470 can include wide area networks (WAN), local area networks (LAN), intranets, the Internet, wireless access networks, wired networks, mobile networks, telephone networks, optical networks, or combinations thereof. The network 470 can be packet switched, circuit switched, of any topology, and can use any communication protocol. Communication links within the network 470 can involve various digital or an analog communication media such as fiber optic cables, free-space optics, waveguides, electrical conductors, wireless links, antennas, radio-frequency communications, and so forth.

The processor 410 can be connected to the other elements of the computing machine 400 or the various peripherals discussed herein through the system bus 420. It should be appreciated that the system bus 420 can be within the processor 410, outside the processor 410, or both. According to some embodiments, any of the processor 410, the other elements of the computing machine 400, or the various peripherals discussed herein can be integrated into a single device such as a system on chip ("SOC"), system on package ("SOP"), or ASIC device.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions unless otherwise disclosed for an exemplary embodiment. Further, a skilled programmer would be able to write such a computer program to implement an embodiment of the disclosed embodiments based on the appended flow charts, algorithms and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the description herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

Although specific embodiments have been described above in detail, the description is merely for purposes of illustration. It should be appreciated, therefore, that many algorithms or aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A system for determining speed and related mapping information of a moving object, comprising:
   a storage resource; and
   a processor communicatively coupled to the storage resource, wherein the processor executes application code instructions that are stored in the storage resource to cause the system to:
   process a plurality of time of flight data over a measurement time interval;
   determine a distance range between the system and each of a plurality of moving objects for each time of flight data;
   calculate speed of at least one of the moving objects;
   determine system coordinates and associate system coordinates with at least one of speed, a change in range of at least one of the moving objects, its azimuthal orientation, time, and angular rate of the system provided from the calculation of the speed, in response to receiving a user initiated lock command;
   receive a map associated with the system coordinates in response to sending a query with the system coordinates to a map database; and
   communicate the map and the at least one of the speed, the change in range of at least one of the moving objects, its azimuthal orientation, time, and the angular rate of the system.

2. The system of claim 1 wherein the processor executes application code instructions to cause the system to determine a linear regression curve-fit on the plurality of time of flight data over the measurement time interval.

3. The system of claim 2 wherein the processor executes application code instructions to cause the system to:
   determine a radial velocity associated with the plurality of time of flight data over the measurement time interval from the slope of the linear regression curve-fit;
   determine a tangential velocity for each time of flight data over the measurement time interval;
   detect angular swivel rate ($d\theta/dt$) of the system using at least one of a gyro and magnetometer; and
   multiply each range by angular rate ($d\theta/dt$) to determine tangential velocity;
   wherein the processor executes application code instructions to calculate speed by causing the system to calculate the square root of the addition of the square of the radial velocity and square of the tangential velocity.

4. The system of claim 1 wherein the processor executes application code instructions to cause the system to:
   wirelessly communicate at least one of the speed, the change in range of at least one the moving objects, its azimuthal orientation, time, and angular rate of the system to a remote GPS enabled device.

5. The system of claim 1 wherein the processor executes application code instructions to cause the system to:
   send a GPS request command to a GPS application executing on a GPS receiver in order to determine system coordinates;
   wherein the GPS application executing on the GPS receiver is executing on either one of a remote GPS receiver and a GPS receiver local to the system.

6. The system of claim 1 wherein the processor executes application code instructions to cause the system to:
   add legends to the map to include information identifying at least one of the speed, the change in range of at least one of the moving objects, its azimuthal orientation, time, and angular rate; and
   overlay tracking information of at least one of the moving objects;
   wherein the tracking information includes at least one color coded track and each color coded track identifies the speed.

7. The system of claim 1 wherein the processor executes application code instructions to cause the system to communicate the map and the at least one of the speed, the change in range of at least one of the moving objects, its azimuthal orientation, time, and the angular rate of the system further includes application code instructions to cause the system to communicate the map and the at least one of the speed, the change in range of at least one of the moving objects, time, and the angular rate of the system to at least one of a display of the system and a remote server system.

8. A computer aided method of a system for determining speed and related mapping information of a moving object, the method comprising:
processing a plurality of time of flight data over a measurement time interval;
determining a distance range between the system and each of a plurality of moving objects for each time of flight data;
calculating speed of at least one of the moving objects;
determining system coordinates and associate system coordinates with at least one of speed, a change in range of at least one of the moving objects, its azimuthal orientation, time, and angular rate of the system provided from the calculation of the speed, in response to receiving a user initiated lock command;
receiving a map associated with the system coordinates in response to sending a query with the system coordinates to a map database;
communicating the map and the at least one of the speed, the change in range of at least one of the moving objects, time, and the angular rate of the system.

9. The computer aided method of claim 8 further comprises determining a linear regression curve-fit on the plurality of time of flight data over the measurement time interval.

10. The computer aided method of claim 9 further comprises:
determine a radial velocity associated with the plurality of time of flight data over the measurement time interval from the slope of the linear regression curve-fit;
determine a tangential velocity for each time of flight data over the measurement time interval;
detecting angular swivel rate (dθ/dt) of the system using at least one of a gyro and magnetometer; and
multiplying each range by angular rate (dθ/dt) to determine tangential velocity;
wherein the processor executes application code instructions to calculate speed by causing the system to calculate the square root of the addition of the square of the radial velocity and square of the tangential velocity.

11. The computer aided method of claim 8 further comprises:
wirelessly communicating at least one of the speed, the change in range of at least one of the moving objects, its azimuthal orientation, time, and angular rate of the system to the remote GPS enabled device.

12. The computer aided method of claim 8 further comprises:
sending a GPS request command to a GPS application executing on a GPS receiver in order to determine system coordinates;
wherein the GPS application executing on the GPS receiver is executing on either one of a remote GPS receiver and a GPS receiver local to the system.

13. The computer aided method of claim 8 further comprises:
adding legends to the map to include information identifying at least one of the speed, the change in range of at least one of the moving objects, time, and angular rate; and
overlaying tracking information of at least one of the moving objects;
wherein the tracking information includes at least one color coded track and each color coded track identifies the speed.

14. The computer aided method of claim 8 wherein the step of communicating the map and the at least one of the speed, the change in range of at least one of the moving objects, its azimuthal orientation, time, and the angular rate further includes the step of communicating the map and the at least one of the speed, the change in range, its azimuthal orientation, time, and the angular rate to at least one of a display and a remote server system.

15. A non-transitory computer readable medium containing computer readable instructions for instructing a computing machine to determine speed and related mapping information of a moving object, the computer-readable instructions comprising instructions for causing the computing machine to:
process a plurality of time of flight data over a measurement time interval;
determine a distance range between the system and each of a plurality of moving objects for each time of flight data;
calculate speed of at least one of the moving objects;
determine system coordinates and associate system coordinates with at least one of speed, a change in range of at least one of the moving objects, its azimuthal orientation, and time provided from the calculation of the speed, in response to receiving a user initiated lock command;
receive a map associated with the system coordinates in response to sending a query with the system coordinates to a map database; and
communicate the map and the at least one of the speed, the change in range of at least one of the moving objects, its azimuthal orientation, and time.

16. The non-transitory computer readable medium of claim 15 further includes computer readable instructions to cause the computing machine to:
determining a linear regression curve-fit on the plurality of time of flight data over the measurement time interval;
measure perpendicular distance (L) between system and direction of travel of at least one of the moving objects;
calculate instantaneous distance (D) in the direction of motion of at least one of the moving objects for each range (R) by subtracting square of a perpendicular distance (L) from square of R and taking square root of the result; and
determine slope of modified linear regression curve-fit over the measurement time interval for D.

17. The non-transitory computer readable medium of claim 15 further includes computer readable instructions to cause the computing machine to:
wirelessly communicate at least one of the speed, the change in range of at least one of the moving objects, its azimuthal orientation, time, and angular rate of the system to a remote GPS enabled device.

18. The non-transitory computer readable medium of claim 15 further includes computer readable instructions to cause the computing machine to:
send a GPS request command to a GPS application executing on a GPS receiver in order to determine system coordinates; and
wherein the GPS application executing on the GPS receiver is executing on either one of a remote GPS receiver and a GPS receiver local to the system.

19. The non-transitory computer readable medium of claim 15 further includes computer readable instructions to cause the computing machine to:
- add legends to the map to include information identifying at least one of the speed, the change in range of at least one of the moving objects, its azimuthal orientation, time, and angular rate; and
- overlay tracking information of at least one of the moving objects;
- wherein the tracking information includes at least one color coded track and each color coded track identifies the speed.

20. The non-transitory computer readable medium of claim 15 wherein the computer readable instructions to cause the computing machine to communicate the map and the at least one of the speed, the change in range of at least one of the moving objects, its azimuthal orientation, and time further includes computer readable instructions to cause the computing machine to communicate the map and the at least one of the speed, the change in range of at least one of the moving objects, its azimuthal orientation, and time to at least one of a display of the system and a remote server system.

* * * * *